United States Patent [19]

Ginzburg

[11] Patent Number: 5,093,974
[45] Date of Patent: Mar. 10, 1992

[54] BENDABLE SLEEVED ROLL

[75] Inventor: Vladimir B. Ginzburg, Pittsburgh, Pa.

[73] Assignees: United Engineering Inc.; International Rolling Mill Consultants, Inc., both of Pittsburgh, Pa.

[21] Appl. No.: 508,985

[22] Filed: Apr. 12, 1990

[51] Int. Cl.$^5$ .................. B21B 31/16; B23P 11/02
[52] U.S. Cl. .................. 29/113.2; 29/129.5; 29/447; 72/243.6; 72/252.5; 72/245
[58] Field of Search .................. 29/110, 113.1, 113.2, 29/116.2, 447, 125, 129, 129.5; 72/241.2, 241.4, 241.6, 241.8, 243.6, 245, 252.5

[56] References Cited

U.S. PATENT DOCUMENTS

| | | | |
|---|---|---|---|
| 2,187,250 | 1/1940 | Sendzimir | 72/241.6 |
| 3,879,828 | 4/1975 | Troost | 29/447 |
| 3,941,435 | 3/1976 | Tuomaala | 308/20 |
| 4,299,109 | 11/1981 | Matsumoto | 72/241 |
| 4,407,151 | 10/1983 | Gronbech | 72/241 |
| 4,683,744 | 8/1987 | Ginzburg | 72/243 |
| 4,722,212 | 2/1988 | Ginzburg | 72/241 |
| 4,813,258 | 3/1989 | Ginzburg | 72/241 |
| 4,829,949 | 6/1989 | Sobue | 29/132 |

OTHER PUBLICATIONS

Iron and Steel Engineer; Jul. 1987; pp. 23-24; V. B. Ginzburg; "Strip Profile Control With Flexible Edge Backup Rolls".

Primary Examiner—Lowell A. Larson
Assistant Examiner—Thomas C. Schoeffler
Attorney, Agent, or Firm—Armstrong, Nikaido, Marmelstein, Kubovcik & Murray

[57] ABSTRACT

A sleeved roll generally has a bendable arbor. The sleeve is shrunk-fit on the arbor such that the dimensional difference between the arbor diameter and the sleeve inner diameter varies along the arbor axis. Thus the radial stresses induced by the shrunk-fit vary along the axis of the arbor.

The sleeved bendable roll may be employed as a work roll or as a backup roll in a rolling mill.

The roll is assembled by providing a bendable arbor having an axial surface and a hollow sleeve, axially contouring at least a portion of the arbor surface or the sleeve inner surface, positioning the hollow sleeve having an inner surface adjacent the arbor, and then shrink-fitting the sleeve inner surface on the axially convexly contoured surface of the arbor.

19 Claims, 8 Drawing Sheets

6A

6B

6C

6D

BENDABLE SLEEVED ROLL

This invention relates to a bendable sleeved roll for reducing the thickness of a flat workpiece in a rolling mill, and to a method for assembling the roll.

A sleeved roll generally has a sleeve which is shrunk-fit onto an arbor. The interference of the fit is typically between 0.0006 to 0.0010 mm/mm of the arbor diameter to prevent axial sliding of the sleeve relative to the arbor. A sliding sleeve condition may result in off-specification product. Sliding is of particular concern during roll bending practices when a roll is designed to be bent by the application of large rolling forces on the roll necks to roll a product to a particularly tight specification.

FIG. 1 schematically shows a conventional prior art roll 20, which generally has an arbor 22 and a sleeve 24. As shown, the sleeved roll 20 backs up a work roll 26 for rolling a workpiece 28. Work rolls of a two high mill also may be sleeved in, e.g., tension rolling units (not shown). The arbor 22 of the prior art roll 20 shown has a cylindrical peripheral surface on which the sleeve 24 is shrunk-fit. FIG. 6(a) schematically shows the stress pattern of the radial stresses induced as a result of the interference fit in the sleeve 24 by the arbor 22 of the roll 20. Also, FIG. 6(a) implies that the resulting frictional forces resisting relative sliding of the sleeve 24 is substantially constant along the entire roll 20 (the frictional force being directly proportional to the radial stress). Thus, there are significant radial forces induced in the axial ends of the sleeve 24 and there is significant frictional resistance to sliding as well.

The rolling forces P/2 applied to the roll necks 30 tend to bend the roll 20 (and the work roll 26) as is shown in FIG. 1. The outer axial portions 32 of the arbor 22 elongate as shown and the sleeve 24 due to its inner strength tends to resist the elongation of the arbor 22. As a result, shear stresses are induced in the interface of the upper portion of the arbor 22 and sleeve 24. Simultaneously, the inner axial portions 34 of the arbor 22 compresses as shown in FIG. 1 and the sleeve 24 due to its inner strength tends to resist the compression of the arbor 22. As a result, shear stresses are also induced in the interface of the lower portion of the arbor 22 and sleeve 24. The shear stresses acting at the upper and lower interface zones have opposite signs. Curves 36, 38 of FIG. 2 schematically show the distribution of the shearing stresses induced in the interface zones of the upper portions and lower portions of the arbor 22 and sleeve 24. During rotation of the roll, the magnitude and sign of the shear stresses cyclicly changes. The combination of cyclic fatigue with the high induced shear stresses, shrink-fitting radial stresses and rolling forces on the axial ends of the sleeve 24 may lead to a condition known as "tire rolling" where the sleeve 24 tends to flatten. In addition, the roll overloading may produce lock-in stresses which result in a distortion of the sleeve outer surface known as "roll eccentricity."

The art has attempted to reduce the combined stress level by various means. The interference fit can be increased to increase the frictional forces for preventing relative sliding, but, interferences above about 0.0010 m/m of arbor diameter must be made with caution in order not to generate excessive radial stresses. Alternatively, the coefficient of friction between the arbor and the sleeve can be increased without increasing the radial stresses by providing interlocking grooves, epoxies or small hard particles in the interface. Also, superfinished shrink-fit surfaces may be employed to develop molecular frictional forces. These alternative techniques still fail to eliminate the problem while undesirably complicating the manufacturing process.

Self compensating bendable rolls have been developed which inherently reduce shear stresses near their axial ends. These self-compensating rolls have concentric sleeves and arbors with their adjacent axial ends radially spaced from each other. Thus, shear stresses can not be induced across these axial spaces. Such rolls are described in U.S. Pat. Nos. 4,813,258; 4,722,212 and 4,683,744 and in "Strip Profile Control with Flexible Edge Backup Rolls", *Iron and Steel Engineer*, July 1987, pages 23-34 by V. B. Ginzburg, which disclosures are hereby incorporated by this reference for their descriptions of bendable sleeved rolls and methods for assembling and employing them in rolling mills.

It has been found that self-compensating sleeved rolls manufactured by a shrink-fit process may not transmit substantially constant radial stresses along the shrink-fit zone. This is especially true when prior to shrink-fitting, both the arbor 42 and sleeve 44 have cylindrical shapes along the shrink-fit zone 46 as shown in FIG. 3. FIG. 3 schematically shows a self-compensating roll 40 generally having an arbor 42 and a sleeve 44. The arbor 42 has an axially extending shrink-fit zone 46 axially between two end zones 48. The sleeve 44 has a confronting shrink-fit zone 50 axially between two end zones 52. As shown, the arbor end zones 48 are radially spaced from the sleeve end zones 52. However, as FIG. 3 also shows, the arbor shrink-fit zone 46 may not be in continuous contact with the sleeve shrink-fit zone 50. FIG. 3 specifically shows a condition where the radially adjacent shrink-fit zones 46, 50 abut only at their edges. It is believed that one or more discontinuities develop in the shrink-fit zone during the fitting step when (in the case where the sleeve shrinks on the arbor) the sleeve end zones 52 continue to shrink after the sleeve shrink-fit zone 50 initially contacts the arbor shrunk-fit zone 46 and thereby tends to arch the sleeve shrunk fit zone 50 away from the arbor shrink-fit zone 46. In addition, the existence of a pocket 54 may result in a flat portion on the roll face if the rolling forces are sufficiently high to collapse the pocket 54.

SUMMARY OF THE INVENTION

Bendable sleeved rolls embodying the present invention are less susceptible to tire rolling and provide substantially more uniform radial stress profiles across their shrunk-fit zones than the prior art rolls.

An improved roll embodying the present invention generally has a bendable arbor having an axis and a diameter. A hollow sleeve having an inner diameter is shrunk-fit on the arbor along its axis such that the dimensional difference between the diameter of the arbor and the inner diameter of the hollow sleeve varies along the axis of the arbor. Thus the shrink-fit stresses vary along the axis. Preferably the dimensional difference in diameters which creates the interference fit is at a maximum in the central portion of the shrink-fit and is at a minimum at the axial edges of the shrink-fit. At least one of the shrink-fit surfaces of the arbor and hollow sleeve is axially contoured to provide a variable interference fit.

A preferred embodiment of an improved roll of the present invention generally has an axis with a surface extending between two axial ends for reducing the thickness of a workpiece in a rolling mill.

The roll has a bendable arbor with an axially extending convexly contoured shrink-fit zone and a first end zone disposed axially of the shrink-fit zone and adjacent a first axial end of the roll. A concentric hollow sleeve has an inner surface. The sleeve inner surface has a shrink-fit zone disposed radially of the convexly contoured shrink-fit zone of tee arbor and a first end zone disposed both axially of the sleeve shrink-fit zone and radially of the arbor first end zone. The radially adjacent first end zones of the arbor and sleeve are adapted to be axially moveable relative to each other when the arbor is bending.

In one form of the preferred embodiment of the invention, the first end zones of the sleeve and arbor abut each other and the first sleeve end zone is adapted to slide over the first arbor end zone, there being low or negligible radial stresses induced in the sleeve end zone in the fitting step. In another form of the preferred embodiment, the adjacent first end zones of the arbor and sleeve are radially spaced apart and define a cavity. The cavity may be advantageously employed in a flexible edged roll of the type disclosed in U.S. Pat. No. 4,683,744 and 4,813,258 and in a self-compensating roll of the type disclosed in U.S. Pat. No. 4,722,212.

Rolls embodying the present invention are advantageously employed as work rolls or as backup rolls in a rolling mill.

Rolls embodying the present invention are assembled by providing a bendable arbor having an axially extending peripheral surface and a hollow sleeve having an inner diameter. At least a portion of the shrink-fit surface of the arbor and/or the sleeve is axially contoured. The hollow sleeve having an inner surface is then shrunk-fit on the arbor. Preferably, radially adjacent end portions of the arbor and sleeve disposed axially of their shrunk-fit portions are adapted to be axially moveable relative to each other when the arbor is bending in a rolling mill. Thus, the radially adjacent abutting end zones are designed to develop no more than relatively low stresses and preferably to effect a sliding fit with negligible stresses between the radially adjacent end zones. Self-compensating bendable rolls are designed with radially spaced end zones.

Other details, objects and advantages will become apparent as the following description of preferred embodiments thereof proceeds.

DESCRIPTION OF THE PREFERRED EMBODIMENTS

Figure 1:
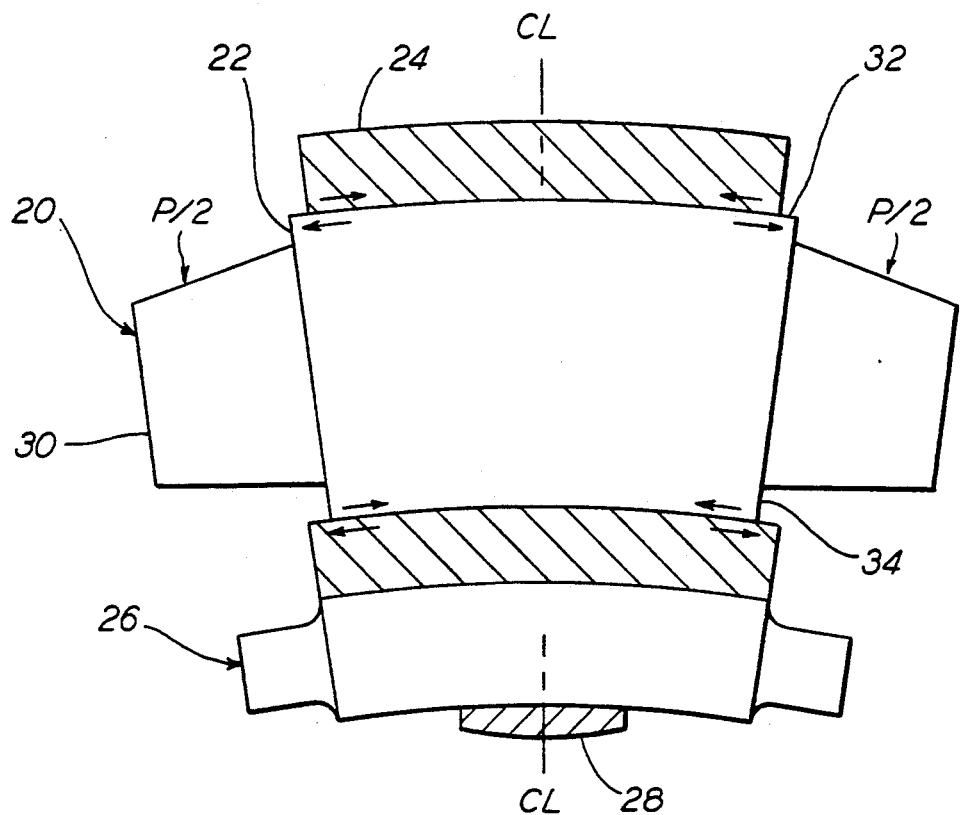
FIG. 1 is a front view of a prior art sleeved backup roll.
Figure 2:
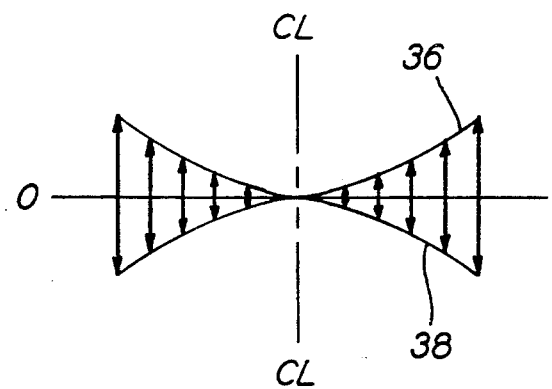
FIG. 2 is a stress diagram generally showing the shear stress pattern which develops in the prior art roll of FIG. 1 due to bending.
Figure 3:
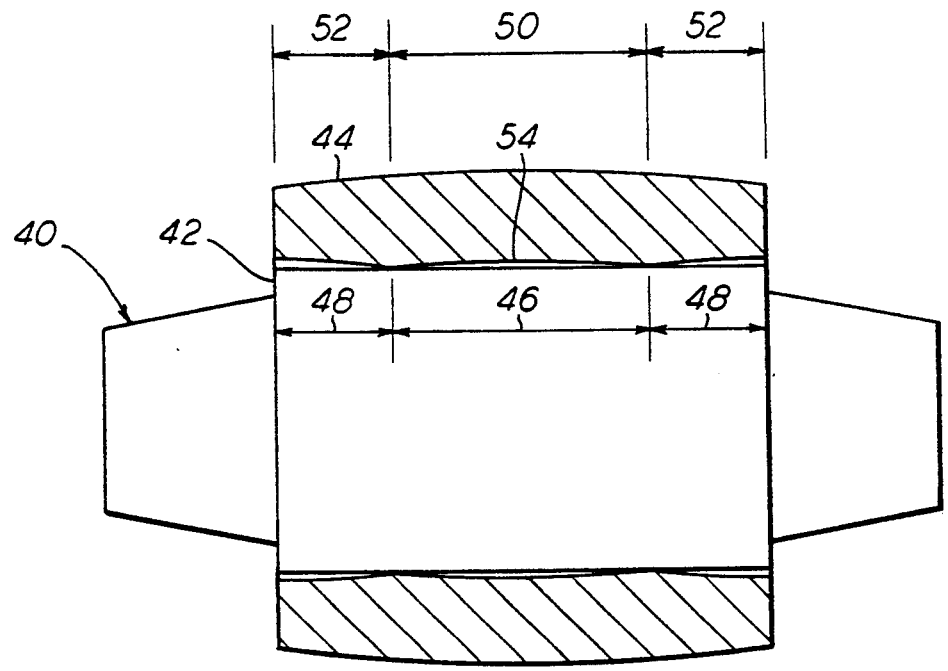
FIG. 3 is a front view of a prior art self-compensating roll.
Figure 4:
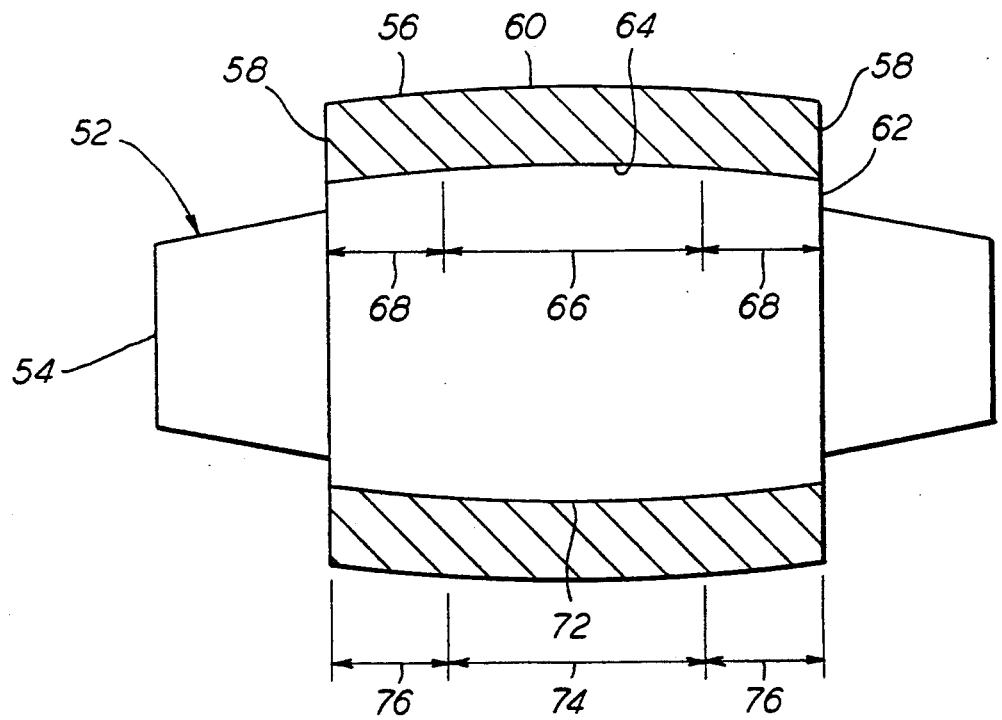
FIG. 4 is a front view of a sleeved roll embodying the present invention.

FIG. 4 illustrates a sleeved roll 52 embodying the present invention. The roll 52 generally has an axis 54 and an outer surface 56 extending between its axial ends 58. The roll 52 generally comprises a sleeve 60 shrunk fit on a bendable arbor 62. Rolls embodying the present invention may be employed to reduce the thickness of flat workpieces of metal, rubber, polymer or paper in a rolling mill. Also, such rolls are advantageously employed in mills for rolling such high strength materials as aluminum and steel. Where a roll 52 is to be employed in a steel or aluminum rolling mill, the sleeve 60 may be preferably forged steel and the arbor 62 may be forged or cast steel. Generally speaking, the shrink-fit may be effected by heating the sleeve 60 and/or chilling the arbor 62, preferably vertically orienting the axes of the sleeve 60 and arbor 62, concentrically aligning the sleeve 60 and arbor 62 and then bringing the assembly to room temperature.

The arbor 62 has an axially extending peripheral surface 64 which comprises a shrink-fit zone 66 and at least one end zone 68 disposed axially of the shrink-fit zone 66. The arbor 62, as shown, has a shrink-fit zone axially between two end zones 68.

The sleeve 60 generally has an inner surface 72, which comprises a shrink-fit zone 74 and at least one end zone 76 disposed both axially of the shrink-fit zone 74 and radially of the arbor end zone 68. The sleeve 60, as shown, has a central shrink-fit zone 74 axially disposed between two end zones 76.

Figure 6:
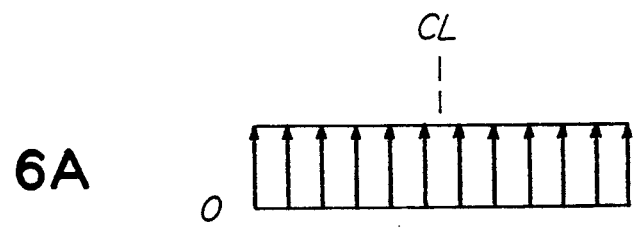
FIGS. 6(a)-6(d) are stress diagrams comparing the stress patterns of the rolls of FIGS. 1, 4 and 5 developed by shrink-fitting steps.
Figure 6:
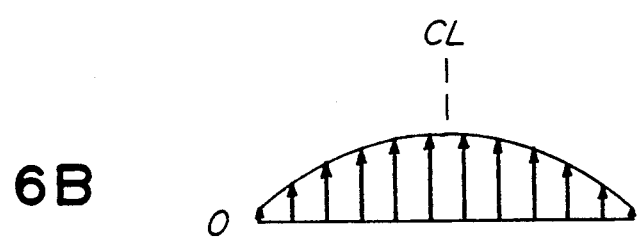
Figure 6:
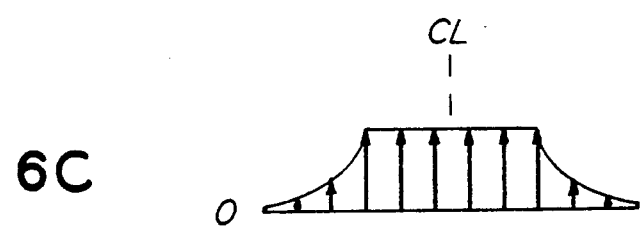
Figure 6:
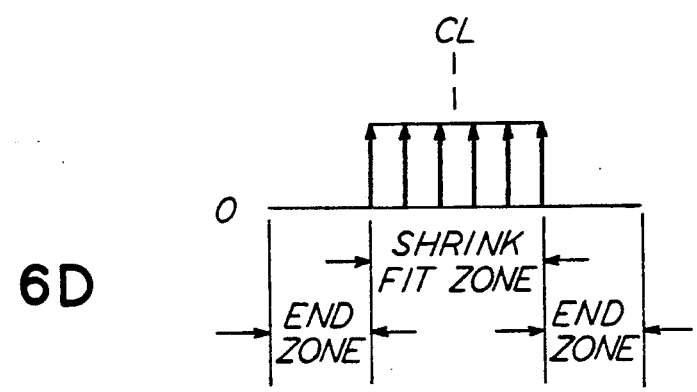

The arbor shrink-fit zone 66 is axially convexly contoured. It may present the general shape of a truncated cone or a caret to the sleeve 60. Preferably, the shrink-fit zone presents a continuously curved convex contour and, most preferably, a parabolic contour. In accordance with the present invention, the interference fit between the sleeve 60 and the arbor 62 varies along the axis 54 of the arbor. Preferably, as is shown in FIG. 6(b), maximum radial stresses are developed in the central portion of the shrink-fit zone at the centerline of the roll 52 and the radial stresses axially decrease toward the ends 58 of the roll 52. This stress pattern is developed by providing a maximum interference at the centerline between the arbor diameter and the radially adjacent sleeve inner diameter of about 0.001 mm/mm arbor diameter or more and then decreasing the dimensional difference of the diameters toward the axial ends 58.

The radially adjacent end zones 68, 76 of the arbor 62 and the sleeve 72 respectively are abutting as shown. In a preferred embodiment of the present invention, the sleeve end zone 76 is adapted to slide over the arbor end zone 68 without generating substantial frictional or shear stresses when the roll 52 is bent. Thus, a sleeve 60 which is to be fitted on an arbor 62 has a minimum diameter in the sleeve end zone 76 at any given point along the roll axis 54 which is no less than the diameter of the radially adjacent portion of the arbor end zone 68 minus 0.0005 mm/mm of arbor diameter. This relative relationship between the radially adjacent end zones will not develop an effective shrink fit between the end zones 68, 76. The end zones 68, 76 may be generally cylindrical or contoured. The sliding fit between the radially adjacent end zones 68, 76 develop negligible radial stresses between them as shown by FIG. 6(c) so that negligible frictional forces and shear stresses develop during bending.

It is difficult to maintain an alignment of a large sleeve 60 and a large arbor 62 when the concentric sleeve 60 is shrunk on the convex surface 64 because the initial contact occurs over a relatively small area. Although the outer surface 56 can be machined to obtain a cylindrical surface, a misalignment may result in excessive localized forces between the sleeve 60 and arbor 62 at the ends 58 of the roll 52. Thus, it may be desirable to provide a temporary annular collar at one end 58 of the roll 52 and align the sleeve 60 concentrically with the arbor 62 and against the collar (not shown) during the assembly process. After the roll 52 is assembled, the collar may be removed.

Figure 5:
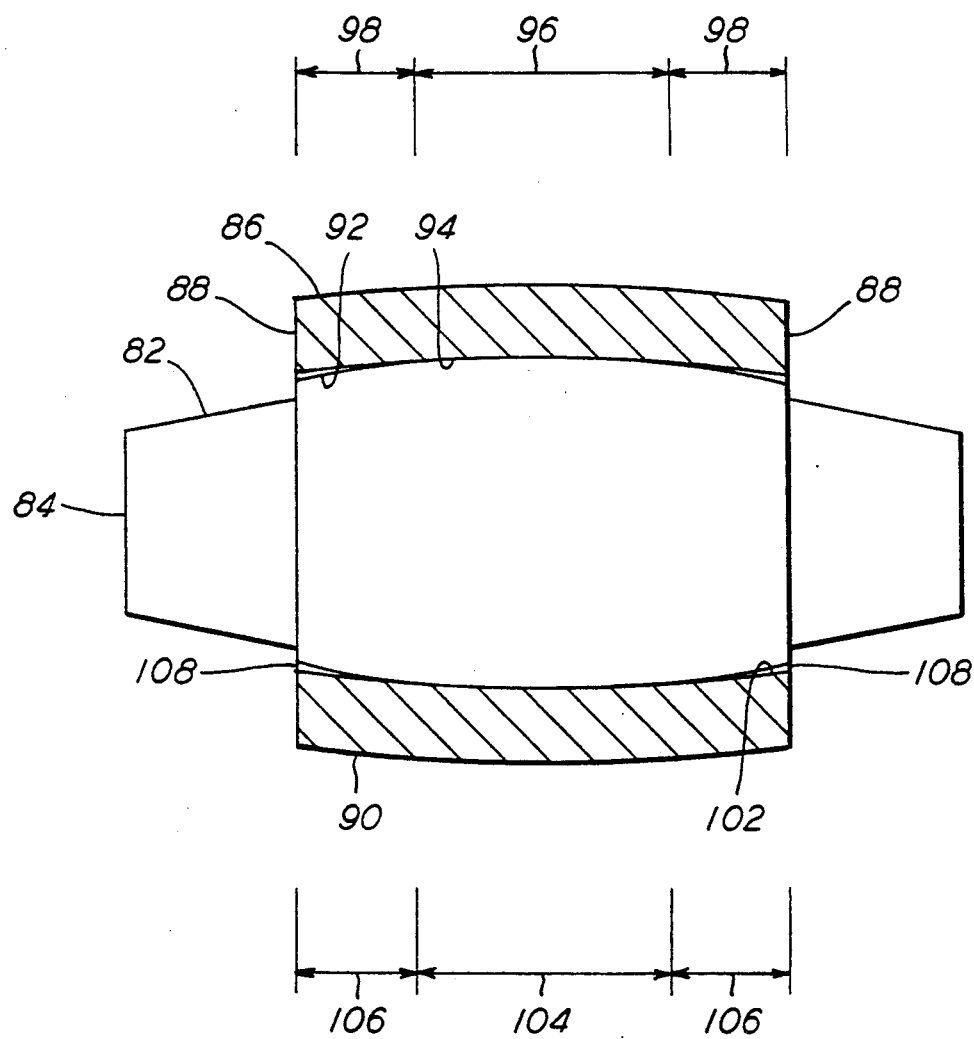
FIG. 5 is a front view of a self-compensating roll embodying the present invention.
Figure 7:
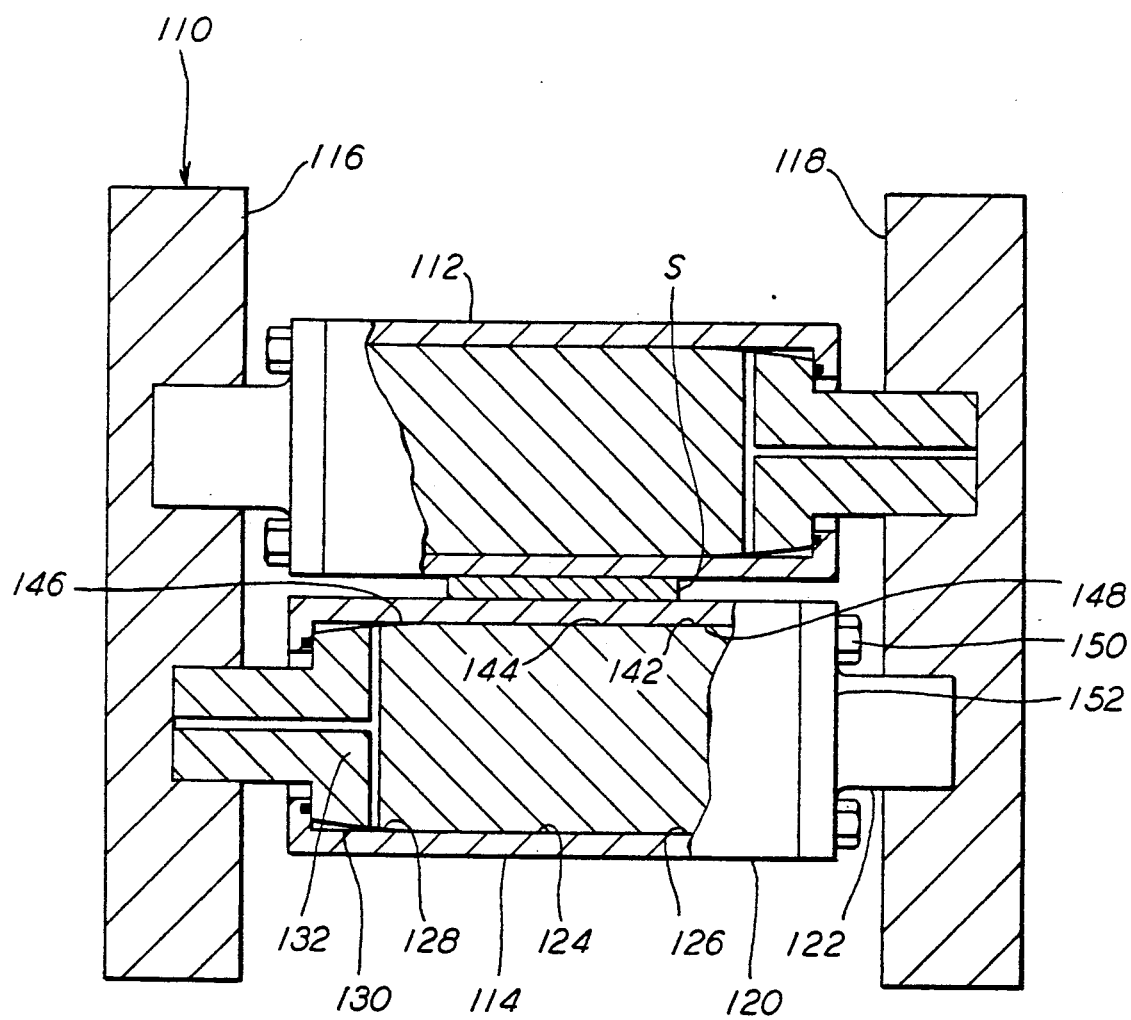
FIG. 7 is a schematic front view of rolls embodying the present invention wherein the rolls are employed as work rolls in a two-high mill.

FIG. 5 illustrates a self-compensating roll 82 embodying the present invention, which is generally similar to the first embodiment shown in FIG. 4. Thus, the roll 82 of FIG. 5 generally has a roll axis 84, a roll surface 86 and axial ends 88. Also, a sleeve 90 is shrunk on an arbor 92. The arbor 92 has an axially extending surface 94 comprising a convexly contoured shrink-fit zone 96 axially adjacent ends zones 98. The sleeve has an inner surface 102 comprising a shrink-fit zone 104 axially adjacent sleeve end zones 106. Unlike the embodiment of FIG. 4, the adjacent end zones 98, 106 of the arbor 92 and the sleeve 90 are spaced apart and generally define cavities 108. The cavities 108 are advantageously employed in self-compensating rolls to provide clearances so that the arbor 92 may bend relative to the sleeve 90. See, e.g., U.S. Pat. No. 4,722,212. The cavities 108 may be contoured by the initial shape of the sleeve 90 and arbor 92 and/or by machining the end zones 98, 106 after the sleeve 90 has been shrunk on the arbor 92. Cavities 108 may also be employed to contain fluids under high pressure in flexible edged rolls, as is shown in FIG. 7. Also, see, e.g., U.S. Pat. No. 4,813,258 and 4,683,744.

A roll 82 as shown in FIG. 5 is particularly useful for rolling high strength materials such as aluminum. Such a roll was designed for a 2000 mm (80 inch) wide 4-high reversing cold mill having a maximum roll separating force of 2,000,000 Kg (4,400,000 pounds). A cylindrical sleeve 90 had an initial nominal inner diameter of 1065 mm (41.960 inches) and an initial outer diameter of 1435 mm (56.5 inches). A continuously contoured arbor 92 had an outer diameter at its axial ends 88 of 1064 mm (41.900 inches), a centerline shrink-fit diameter of 1067 mm (42.000 inches) and axially intermediate diameters at the edges of the central shrink-fit zone of 1066 mm (41.98 inches). The sleeve 90 was first heat shrunk onto the arbor 92 and then outer surface 86 of the roll was machined and ground to a diameter of 1422 mm (56 inches). The roll cavity 108 had a gap of about 0.38 mm (0.015 inches) at the ends 88 of the roll 82. It is noted that the end diameter of the fitted sleeve was less than the initial diameter of the sleeve and that a gap of 0.38 mm is about 20% less than a theoretical gap based upon half the difference between the initial dimensions of the sleeve 90 and arbor 92. The ideal stress pattern developed in the sleeve 86 during the shrink fit step is shown in FIG. 6(d).

Thus, rolls embodying the present invention, such as the rolls 52 and 82, which have such axially convex shrunk-fit surfaces tend to maintain good eccentricity in the shrink-fit zone and near their axial ends 58, 98, respectively.

FIG. 7 shows a 2-high mill 110 having work rolls 112, 114 embodying the present invention which axially extend between frame members 116, 118 for rolling a flat workpiece "S" to a thinner product. The work rolls 112, 114 are essentially identical although oppositely oriented. Each work roll 112, 114 has a sleeve 120 and an arbor 122. Each arbor 122 has an arbor surface 124 which generally comprises an axially extending convexly contoured shrink-fit zone 126 and an axially adjacent end zone 128 which defines a wall of a cavity 130 communicating with passageway 132. As shown, the arbor shrink-fit zone 126 may be adjacent one of its ends. Each sleeve 120 has an inner surface 142 generally comprising a shrink-fit zone 144 and an axially adjacent end zone 146 which defines a second wall of the cavity 130. As is shown, the end 148 of the sleeve adjacent its shrunk-fit zone may be fastened by bolts such as bolt 150, or other suitable fastening means including welding, to a flange 152 integral with or welded to the arbor 122 for rotating the sleeve 120 with the arbor 122. As is disclosed by the prior art patents, the work rolls 112, 114 are asymmetrical because only the end of each roll 112, 114 adjacent the cavity 130 is bent and/or subjected to high pressure fluids for radially expanding the sleeve end zones 146.

Figure 8:
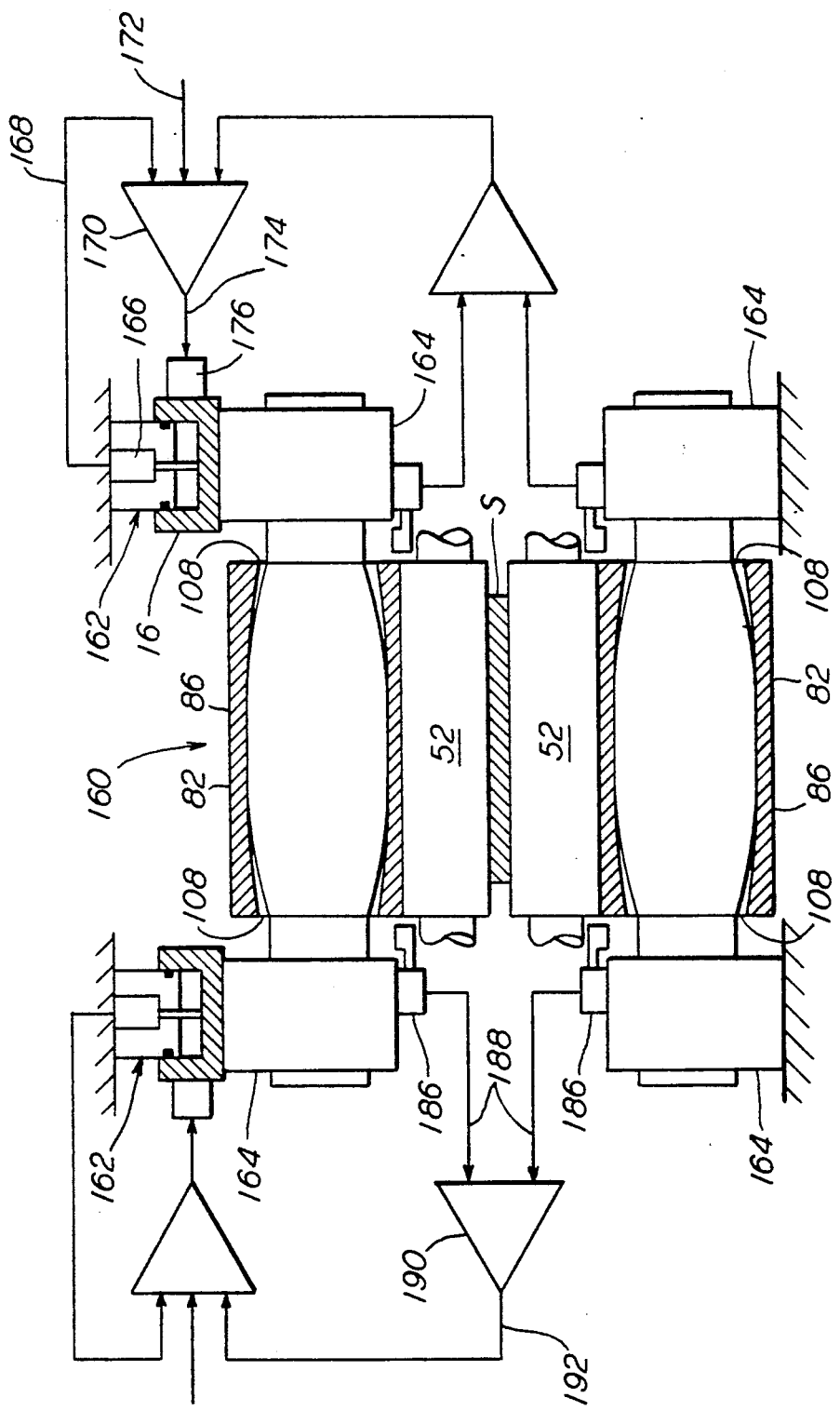
FIG. 8 is a schematic front view of rolls embodying the present invention wherein the rolls are employed in a four-high mill as backup rolls.

FIG. 8 generally shows a 4-high mill 160 employing work rolls 161 and backup rolls 82 (which are shown in more detail in FIG. 5) to roll a flat workpiece "S". Such a mill 160 may be advantageously employed in combination with known control systems to roll flat workpieces having good shape and other properties. Whatever the control system may be, it will include a means such as hydraulic piston cylinder assemblies 162 or an electrically operated screw-down (not shown) for exerting roll bending forces on roll chocks 164 to control the roll gap. As is shown in FIG. 8, a conventional piston cylinder assembly 162 may be controlled via a feed back type of control loop. Thus, a roll gap sensor 166, senses piston position or cylinder pressure and then outputs a feed back signal on line 168 to a roll gap regulator 170. The regulator 170 compares the feed back signal with a reference signal from line 172 that is input manually or by a supervisory computer or a microprocessor (either of which may incorporate the regulator 170), and then outputs a control signal on line 174 to a hydraulic fluid servovalve 176 operatively connected with the piston cylinder 178.

FIG. 8 also shows a means for continuously compensating for backup roll eccentricity during rolling. Backup roll eccentricity sensors 186 are installed adjacent the upper backup roll chocks 164, and preferably the lower backup roll chocks 164 (as is shown), to sense the eccentricity of the backup roll(s) 82. Each eccentricity sensor 186 detects the vertical displacement of the backup roll surface 86 with reference to the adjacent bearing chock 164 and then outputs an eccentricity correction signal on an output line 188 to the roll gap regulator 170. Where eccentricity sensors 186 sense the eccentricity of both backup rolls 82, the output signals on lines 188 may be advantageously added by a summing amplifier 190 and the added signals output on feed back line 192 to the roll gap regulator 170. The regulator 170 may then add the summed eccentricity signal to the reference signal and compare the actual roll gap feedback signal for outputting a control signal on line 174.

Figure 9:
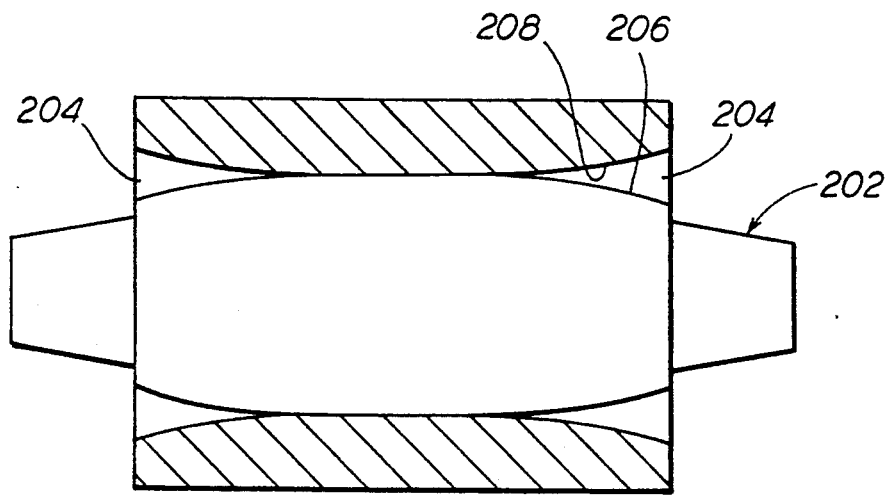
FIG. 9 is a front view of a fourth embodiment of a sleeved roll embodying the present invention.
Figure 10:
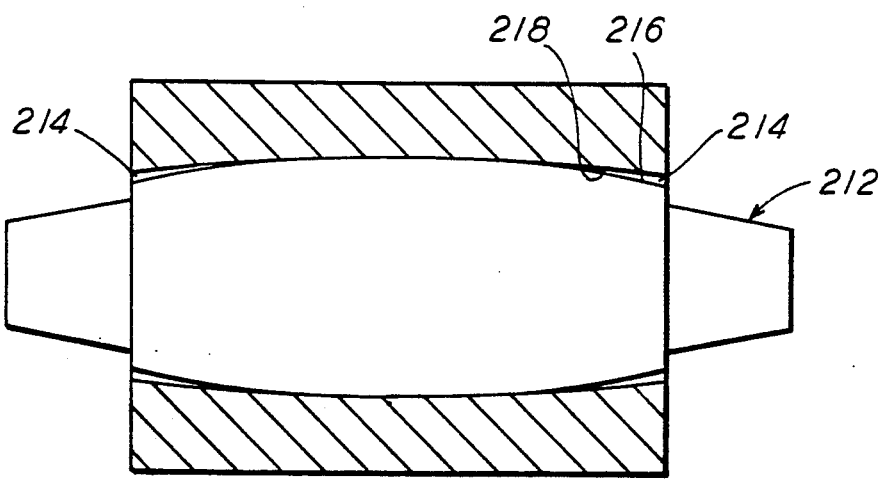
FIG. 10 is a front view of a fifth embodiment of a sleeved roll embodying the present invention.
Figure 11:
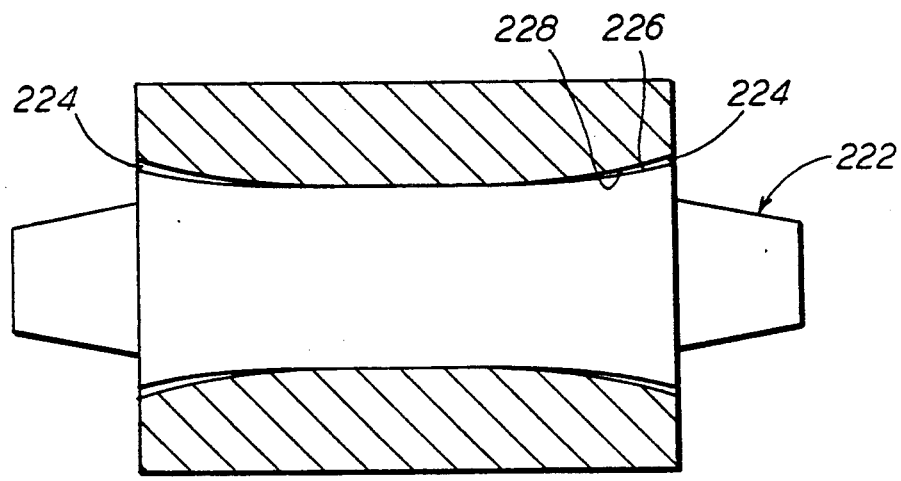
FIG. 11 is a front view of a sixth embodiment of a sleeved roll embodying the present invention.
Figure 12:
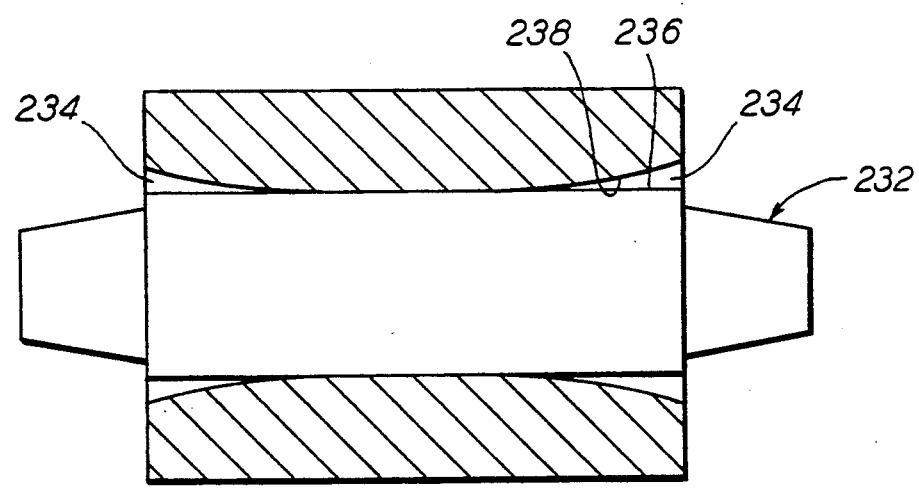
FIG. 12 is a front view of a seventh embodiment of a sleeved roll embodying the present invention.

In addition to the rolls 52 and 82 shown in FIGS. 4, 5 and 8, which generally comprise convexly contoured arbors and cylindrical sleeves (before the shrink-fit), rolls embodying the present invention may also have other contoured shrink-fit zones provided that the arbor peripheral surface or the sleeve inner surface is contoured (i.e., other than cylindrical) in the shrink-fit zone. FIG. 9 generally shows a roll 202 having end cavities 204, and a convexly contoured arbor 206 and a convexly contoured sleeve 208. FIG. 10 generally shows a roll 212 having end cavities 214, and a convexly contoured arbor 216 and a concavely contoured sleeve 218. FIG. 11 generally shows a roll 222 having end cavities 224, and a concavely contoured arbor 226 and a convexly contoured sleeve 228. FIG. 12 generally shows a roll 232 having end cavities 234, and a cylindrically contoured arbor 236 and a convexly contoured sleeve 238. Rolls similar to roll 52 of FIG. 4 may be contoured like the rolls 202, 212, 222 and 232 shown in FIGS. 9-12.

While presently preferred embodiments of the invention, including improved bendable sleeved rolls and methods for assembling these rolls, and rolling mills employing them have been described and shown, it is to be distinctly understood that the invention is not limited thereto, but may be otherwise variously embodied within the scope of the following claims.

What is claimed is:

1. A roll for reducing a thickness of a workpiece in a rolling mill, said roll comprising:
   (a) a bendable arbor having an axis, a diameter, a shrink-fit zone and at least one end zone disposed axially of said shrink-fit zone; and
   (b) a hollow sleeve shrunk-fit on said arbor along said axis, said hollow sleeve having an inner diameter, with a dimensional difference between said diameter of said arbor and said inner diameter of said sleeve being such that maximum radial stresses are developed in a central portion of said shrink-fit zone and the radial stresses decrease towards the end of said shrink-fit zone.

2. A rolling mill for reducing the thickness of a workpiece, said rolling mill including a pair of workrolls, wherein said pair of workrolls comprise a pair of rolls of claim 1.

3. A rolling mill for reducing the thickness of a workpiece, said rolling mill including a pair of backup rolls, wherein said pair of backup rolls comprise a pair of rolls of claim 1.

4. The roll of claim 1, wherein said arbor has an axially contoured peripheral surface on which said hollow sleeve is shrunk-fit.

5. The roll of claim 1, wherein said hollow sleeve has an axially contoured inner surface which is shrunk-fit on said arbor.

6. The roll of claim 5, wherein the contoured inner surface of the sleeve is shrunk-fit on an axially contoured peripheral surface of the arbor.

7. A roll having a roll axis and a roll surface extending between two axial ends for reducing a thickness of a workpiece in a rolling mill, said roll comprising:

(a) a bendable arbor having a peripheral surface, said peripheral surface including an axially extending convexly contoured shrink-fit zone, and a first end zone disposed axially of said arbor shrink-fit zone adjacent a first axial end of said peripheral surface of said roll; and (b) a concentric hollow sleeve having an inner surface including a shrink-fit zone shrunk on said convexly contoured shrink-fit zone of said arbor and a first end zone disposed both axially of said hollow sleeve shrink-fit zone and radially of said arbor first end zone, said first end zone of said arbor and said first end zone of said sleeve being adapted to be axially moveable relative to each other when said arbor is bending, such that maximum radial stresses are developed in the central portion of said shrink-fit zone and the radial stresses decrease towards said first end zone.

8. The roll of claim 7, further comprising a mechanical fastening means adjacent the second axial end of the roll surface for fastening the sleeve to the arbor to rotate the sleeve with the arbor.

9. The roll of claim 7, wherein the first end zone of the sleeve abuts the adjacent first end zone of the arbor, and the abutting end zone of the sleeve is adapted to axially slide over the first end zone of the arbor when the arbor is bending.

10. The roll of claim 9, further comprising: a second arbor end zone disposed axially of the arbor shrink-fit zone and adjacent a second axial end of the roll surface; and a second sleeve end zone disposed both axially of the sleeve shrink-fit zone and radially of the arbor second end zone, the second end zones of the arbor and sleeve being adapted to be axially moveable relative to each other when the arbor is bending.

11. The roll of claim 7, wherein the first sleeve end zone is radially spaced from the adjacent first end zone of the arbor, the adjacent end zones defining a cavity.

12. The roll of claim 11, further comprising:
   a second arbor end zone disposed axially of the arbor shrink-fit zone and adjacent a second axial end of the roll surface; and
   a second sleeve end zone disposed both axially of the sleeve shrink-fit zone and radially of the arbor shrink-fit zone, the second end zones of the arbor and the sleeve defining a second cavity.

13. The roll of claim 12, wherein the arbor has a passageway which communicates with the cavity for providing a fluid to the cavity.

14. A method of assembling an axially bendable roll having a sleeve shrunk-fit on an arbor, and having an axis, with a surface extending between two axial ends comprising the steps of:

providing a bendable arbor having an axis, and a peripheral surface; providing a hollow sleeve having an inner surface; axially contouring at least a portion of the arbor peripheral surface or the hollow sleeve inner surface to provide a maximum interference between said arbor peripheral surface and said inner surface of said hollow sleeve at a central shrink-fit zone thereof;

positioning the hollow sleeve having said inner surface adjacently about the arbor; and shrink fitting the sleeve and arbor convexly contoured surface together, such that, upon such shrink fitting, maximum radially stresses are developed in the center of said shrink-fit zone and the radial stresses decrease towards the axial ends of the roll.

15. The method of claim 14, wherein a central portion of said peripheral surface of said bendable arbor is axially contoured.

16. The method of claim 14, wherein a central portion of said inner surface of said hollow sleeve is axially contoured.

17. The method of claim 14, wherein said arbor surface has axial ends, further comprising the step of adapting at least one of said axial ends of the arbor surface to be axially moveable relative to the radially adjacent inner sleeve surface when the arbor is bending.

18. The method of claim 14, wherein said arbor has an end zone radially adjacent at least one end zone of the sleeve, and the at least one end zone of the sleeve is adapted to axially slide against said radially adjacent arbor end zone when the arbor is bending.

19. The method of claim 18, wherein said arbor has at least one end, radially adjacent said inner sleeve surface, and said one end of the arbor is adapted to be radially spaced from said radially spaced adjacent inner sleeve surface.

* * * * *